United States Patent [19]

Kobayashi et al.

[11] Patent Number: 5,421,210
[45] Date of Patent: Jun. 6, 1995

[54] CAPACITANCE TYPE ELECTROMAGNETIC FLOWMETER

[75] Inventors: Tamotsu Kobayashi; Takashi Torumaru, both of Tokyo, Japan

[73] Assignee: Yokogawa Electric Corporation, Tokyo, Japan

[21] Appl. No.: 114,318

[22] Filed: Aug. 30, 1993

[30] Foreign Application Priority Data

Jan. 29, 1993 [JP] Japan .................................. 5-013211

[51] Int. Cl.⁶ ............................................. G01F 1/53
[52] U.S. Cl. .................................. 73/861.12; 73/861.08
[58] Field of Search .................... 73/861.08, 861.12

[56] References Cited

U.S. PATENT DOCUMENTS

| | | | |
|---|---|---|---|
| 3,839,912 | 10/1974 | Schmoock et al. | 73/861.12 |
| 3,991,612 | 11/1976 | Mannherz et al. | 73/861.17 |
| 4,036,052 | 7/1977 | Searle | 73/861.17 |
| 4,434,666 | 3/1984 | Hemp et al. | 73/861.12 |
| 4,631,969 | 12/1986 | Schmoock | 73/861.12 |
| 4,658,652 | 4/1987 | Picone et al. | 73/861.12 |
| 4,953,408 | 9/1990 | Appel et al. | 73/861.16 |
| 5,271,280 | 12/1993 | Nissen | 73/861.12 X |
| 5,325,724 | 7/1994 | Kiene et al. | 73/861.12 X |

FOREIGN PATENT DOCUMENTS

| | | | |
|---|---|---|---|
| 1498323 | 2/1969 | Germany | 73/861.12 |
| 2063792 | 7/1972 | Germany | 73/861.12 |
| 3018260 | 11/1981 | Germany | 73/861.12 |
| 2064130 | 6/1981 | United Kingdom | 73/861.15 |

*Primary Examiner*—Richard F. Chilcot, Jr.
*Assistant Examiner*—Elizabeth L. Dougherty
*Attorney, Agent, or Firm*—Moonray Kojima

[57] ABSTRACT

A capacitance type electromagnetic flowmeter which is capable of measuring flow rates of fluid without being affected by the flow velocity distribution. When the flow tube of the flowmeter is an open conduit, the measurement is made without being affected by variations in the liquid level. The flowmeter comprises a flow tube insulated at least on an inner surface thereof; an exciting means for applying a magnetic field to the fluid, and a pair of detecting electrodes disposed in the flow tube, which are electrically insulated from the fluid and extend at right angles to the flow tube axis and magnetic field. The length of the electrodes is proportional to the cosine of an angle between a line normal to the wall of the flow tube and an axis perpendicular to both axes of the flow tube and magnetic field. Where a conduit is used, the liquid has a free surface, and currents produced from the detecting electrodes are converted by a current-to-voltage converter into voltage signals.

10 Claims, 5 Drawing Sheets

CAPACITANCE TYPE ELECTROMAGNETIC FLOWMETER

BACKGROUND OF THE INVENTION

1. Field of Invention

This invention relates to a capacitance type electromagnetic flowmeter for detecting, via electrostatic capacitances, signal voltages corresponding to flow rates produced in a fluid undergoing measurement and, more particularly, to an improved capacitance type electromagnetic flowmeter which detects signals from a closed flow tube without being affected by the flow velocity distribution in a fluid when the flow tube is completely filled with the fluid, and which also detects such signals without being affected by either changes in the level of the fluid or flow velocity distribution even when the closed flow tube is not completely filled with the liquid. Furthermore, the invention relates to an improved capacitance type electromagnetic flowmeter capable of detecting the signal voltages without being affected by either changes in the level of the fluid being measured or flow velocity distribution even in an open conduit having a free liquid surface.

2. Description of the Prior Art

FIG. 1 shows a conventional electromagnetic flowmeter designed to reduce the effect of flow velocity distribution, such as disclosed, for example, in Japanese Patent Publication No. 28325/1980 entitled "Electromagnetic Flowmeter".

In such conventional device, a tube 10 is provided which has an electrically insulated inner surface. Magnets 11 and 12 are disposed on opposite sides of tube 10 to apply magnetic flux $\Phi$ to tube 10. A plurality of pairs of electrodes 13a,13b,14a, 14b, 15a, 15b, 16a,16b,and 17a, 17b, are mounted on the insulated inner surface of tube 10. Electrodes 13a and 13b are arranged in diametrically opposite relation to each other in the center of tube 10. Electrodes 14a and 14b are respectively located a given distance above electrodes 13a and 13b, and electrodes 15a and 15b are respectively located above electrodes 14a and 14b and spaced a given distance from electrodes 14a and 14b. Electrodes 16a,17a, 16b, and 17b are successively regularly located downward from electrodes 13a and 13b, respectively. Electrodes 13a and 13b are connected to a first amplifier 18. Electrodes 14a and 14b are connected to a second amplifier 19. Electrodes 15a and 15b are connected to a third amplifier 20. Electrodes 16a and 16b are connected to a fourth amplifier 21. Electrodes 17a and 17b are connected to a fifth amplifier 22.

The outputs from amplifiers 18-22 are applied to a converter 23, which applies the average of the outputs across output terminals 24a and 24b. Amplifiers 18-22, converter 23, and other components together form a signal processor 25.

In the FIG. 1 device, numerous electrode pairs are arranged radially around tube 10. Consequently, the output signal appearing across the output terminals 24a and 24b indicates the average of the flow velocities of fluid flowing across various portions of tube 10.

Accordingly, if the flow velocity distribution is not symmetrical with respect to the axis, the output voltage developed across output terminals 24a and 24b is in proportion to the flow rate of the fluid flowing through tube 10.

The conventional electromagnetic flowmeter described above cannot sufficiently suppress the effect of the flow velocity distribution unless numerous electrodes are provided in contact with the liquid. This makes the structure and arrangement of the electrodes complex. In addition, liquid might leak from the electrodes. If a small diameter tube is used, there is no space for accommodating the electrodes. Thus, in practice it is difficult to fabricate this type of flowmeter. Also, the signal processor must incorporate numerous amplifiers for averaging out the signal voltages. This increases costs.

A further problem encountered by the prior art is that the electrodes are widely spaced from each other. In particular, when the inside of the tube is not completely filled with liquid or when the liquid level varies, such as in the case of of an open conduit, the detected signal voltage takes the form of a discrete signal. This limits the accuracy of calculation of the flow rates.

Another problem arises when the tube is not completely filled. In that case, the mutually spaced electrodes may be brought into and out of contact with the fluid being measured by variations in the free liquid surface. Thus, electrochemical potentials on the surfaces of the electrodes will vary greatly, thereby resulting in large variations of indicated values.

SUMMARY OF THE INVENTION

Accordingly, an object of the invention is to overcome the aforementioned and other disadvantages and deficiencies of the prior art.

Another object is to provide an electromagnetic flowmeter having a simplified electrode structure which is unaffected by the flow velocity distribution in liquid and which does not leak liquid.

A further object is to provide an electromagnetic flowmeter having an electrode structure which is not affected by the flow velocity distribution even when the diameter of the flowmeter is small.

A still further object is to provide an electromagnetic flowmeter which comprises a closed flow tube and which is not affected by the flow velocity distribution in a fluid being measured when the fluid flows through the flow tube without completely filling the tube.

A yet further object is to provide an electromagnetic flowmeter which comprises a closed flow tube and whose accuracy does deteriorate with variations in liquid level when the fluid being measured flows through the flow tube without completely filling the tube.

Another object is to provide an electromagnetic flowmeter which is capable of measuring the flow rate of fluid flowing through an open conduit having an open liquid surface without being affected either by variations in the liquid level or by variations in the flow velocity distribution.

The foregoing and other objects are attained by the invention which encompasses an electromagnetic flowmeter comprising a flow tube, electrically insulated at least on its inner surface; an exciting means for applying a magnetic field to a fluid being measured in an orthogonal relation to the axis of the flow tube; and a pair of detecting electrodes mounted in the flow tube and electrically insulated from the fluid. The electrodes extend perpendicular to both the axis of the flow tube and the magnetic field. The flowmeter is characterized in that the length of each of the electrodes taken axially of the flow tube is so set as to be in proportion to the cosine of an angle made between a line normal to the wall of the flow tube and an axis which is perpendicular to both the axis of the flow tube and to the magnetic field.

In this manner, the length of each of the electrodes, taken axially of the flow tube, is so set as to be in proportion to the cosine of an angle made between a line normal to the wall of the flow tube and an axis which is perpendicular to both the axis of the flow tube and to the magnetic field. Thus, flow signals originating from various points on the detecting electrodes are produced while weighted with the cosine of the angle just described. As a result, an output can be obtained without being affected by the flow velocity distribution.

Another embodiment of the invention comprises a conduit, which is electrically insulated at least on its inner surface and through which a fluid to be measured flows, the conduit having a free liquid surface therein; an exciting means for applying a magnetic field perpendicular to the free liquid surface; a pair of detecting electrodes mounted in the conduit and electrically insulated from the fluid; and a current-to-voltage converter means for converting electrical current signals, obtained from the detecting electrodes according to the flow rate of the fluid, into voltage signals.

Also, a signal accurately indicating the flow rate can be derived by passing the current signals through a current-to-voltage converter when the inside of the conduit is not completely filled with fluid, the current signal originating from the detecting electrodes which are insulated from the fluid.

DESCRIPTION OF THE PREFERRED EMBODIMENTS

Figure 1:
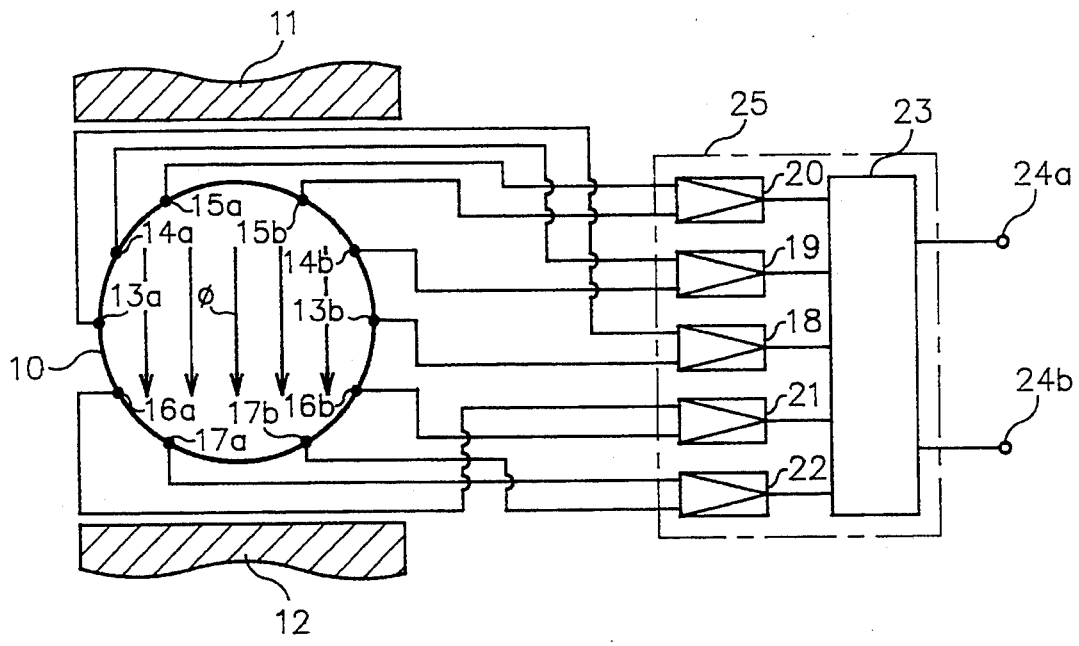
FIG. 1 is a diagram depicting a conventional electromagnetic flowmeter.
Figure 2:
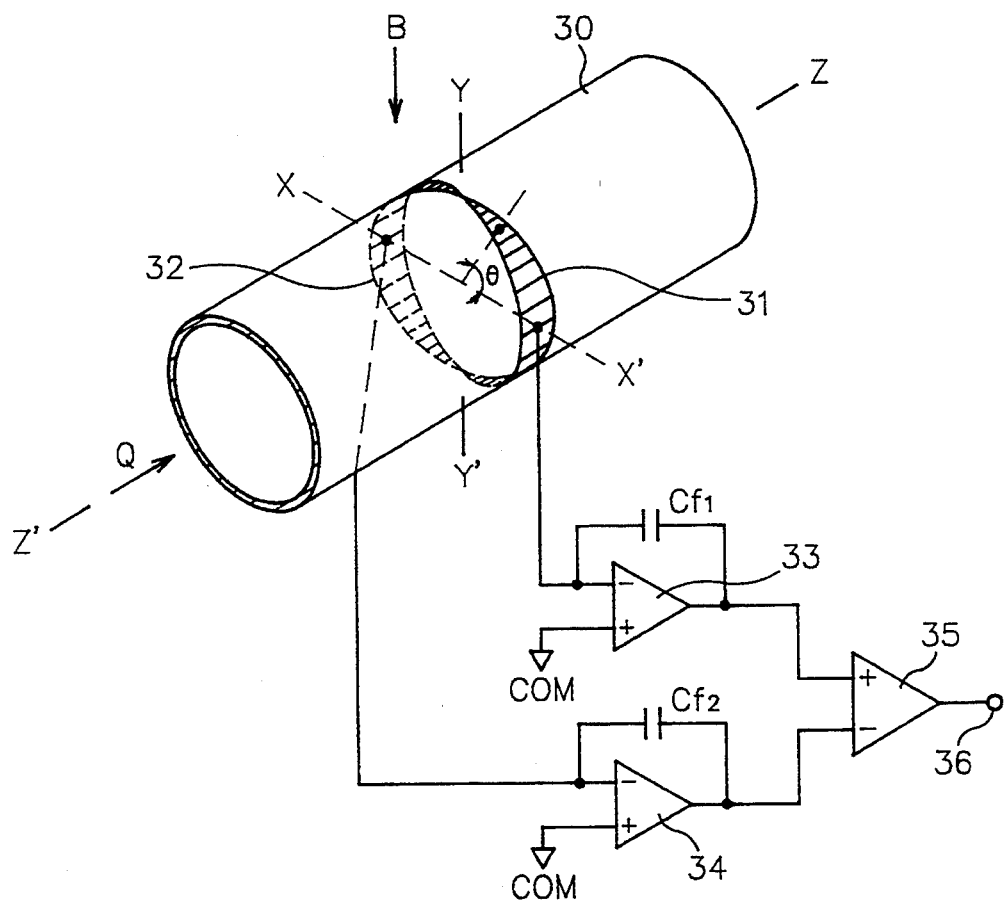
FIG. 2 is a partial cross and circuit diagram depicting an illustrative embodiment of the invention.

The flowmeter shown in FIG. 2 comprises an insulated cylindrical flow tube 30 through which fluid Q, to be measured, flows. A uniform magnetic field B is applied orthogonal or perpendicular to the axis of the flow tube 30.

A pair of conductive electrodes 31 and 32 are mounted in the center of flow tube 30 along the outer wall thereof in opposite relation to each other, as depicted. Electrodes 31 and 32 are electrically insulated from liquid Q. The length of electrodes 31 and 32 taken along the axis of the flow tube is proportional to the cosine of an angle $\theta$ made between the curved surface of flow tube 30 and a line X—X' connecting the centers of detecting electrodes 31 and 32 at a point at which a line Y—Y', crossing the central cross section of flow tube 30, intersects axis Z—Z' of the flow tube.

Detecting electrode 31 is connected to the inverting input terminal (−) of an operational amplifier 33, whose non-inverting input terminal (+) is connected to a common potential point COM. The output terminal of amplifier 33 is connected to the inverting input terminal (−) of amplifier 33 via a capacitor $C_{f1}$.

Similarly, detecting electrode 32 is connected to the inverting input terminal (−) of an operational amplifier 34 whose non-inverting input terminal (+) is connected to a common potential point COM. The output terminal of the amplifier 34 is connected to the inverting input terminal (−) of amplifier 34 via a capacitor $C_{f2}$.

The output terminals of operational amplifiers 33 and 34 are connected to the non-inverting input terminal (+) and the inverting input terminal (−), respectively, of a third operational amplifier 35. Amplifier 35 outputs the difference between the voltage signals from amplifiers 33 and 34, to an output terminal 36.

In the FIG. 2 embodiment, fluid Q, being measured, flows through flow tube 30 and produces an electromotive force inside the fluid. This force creates a given potential distribution in the fluid along the inner wall of the insulated flow tube 30. Composite signal voltages produced by this potential distribution are detected by electrodes 31 and 32, via electrostatic capacitances $C_{w1}$ and $C_{w2}$, respectively, formed by the flow tube 30.

Since electrostatic capacitances $C_{w1}$ and $C_{w2}$ are quite small, the current signals detected by electrodes 31 and 32 are small and are supplied to the operational amplifiers 33 and 34, respectively, which convert the respective input current signals into voltage signals. The difference between these two voltage signals from amplifiers 33 and 34 is then outputted to output terminal 36 by operational amplifier 35.

The embodiment is able to accurately measure flow rates without being affected by the flow velocity distribution even when the inside of flow tube 30 is not completely filled or even when the flow tube is a partially open conduit. This phenomenon is described in further detail hereinbelow.

Figure 3:
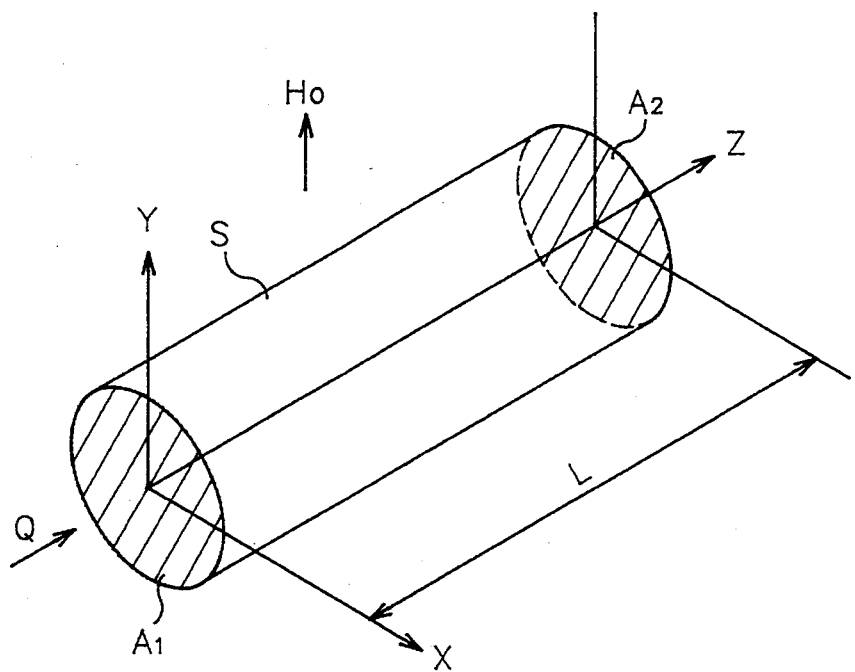
FIG. 3 is a diagram depicting the operation of the embodiment of FIG. 2.

For convenience of illustration, the principles of operation of an integration type electromagnetic flowmeter will be described. In FIG. 3, the cross-section of the flow tube of an electromagnetic flowmeter is uniform along the axis of the flow tube, or Z-axis direction, irrespective of the shape of the cross section. It is assumed that the wall of the flow tube is insulated.

It is also assumed that a uniform magnetic field having a strength of $H_o$ is applied in the Y-axis direction, perpendicular to the axis of the flow tube. The magnetic field covers a length of L in the Z-axis direction. The X-axis is taken at right angles to the Y-axis and the Z-axis. A cylindrical region having the length L and surrounded by the inner wall of the flow tube is the subject of analysis hereat. Let S be the area of the curved surface of the cylindrical region. Let $A_1$ and $A_2$ be the two cross sections, respectively, which have an area of A. A fluid flows in the Z-axis direction at a flow rate of Q.

Maxwell field equations hold at any arbitrary point within the region. if the magnetic field varies slowly, displacement current can be neglected compared with conduction current. Where none of the polarization of the fluid, transportation of the electric charge by the fluid, generation of electric charge, and annihilation of the electric charge, take place, the following equations hold:

$$\text{rot } H = J \qquad (1)$$

$$\text{rot } E = 0 \qquad (2)$$

where H is a vector indicating a magnetic field strength, J is a vector indicating a current density, and E is a vector indicating the electric field strength. Let $\sigma$, $\mu$, and v be a specific conductance, permeability, and a vector indicating a flow velocity, resppectively. The current density J can be give by $$J = \sigma(E + \mu v \times H) \qquad (3)$$

Generally, H is given by the sum of the applied magnetic field $H_o$ and induced magnetic field h. That is, $H = H_o + h$. Where the electromagnetic flowmeter is an industrial flowmeter for measuring flow rates of an electrolyte, such as water, the induced magnetic field h is sufficiently small under normal measuring conditions and can be neglected.

Let $i_x$ be a unit vector in the X-axis direction. Application of the Gaussian dispersion theorem to field vector $i_x \times H_o$ gives rise to the following:

$$\int_v div(i_x \times H_o) dv = \int_{s, A1, A2} (i_x \times H_o) \cdot i_n da \qquad (4)$$

The volume integration on the left side is performed over the entire region. The area integration on the right side is performed on the curved surface S and on both cross sections $A_1, A_2$. In the above equation, $i_n$ is the unit vector directed outward from each surface. From the equations for vector calculations, the following equation holds for the left side:

$$div(i_x \times H_o) = -i_x \cdot \text{rot } H_o$$

With respect to the right side, $(i_x \times H_o)$ is perpendicular to $i_n$ on the curved surface. On the cross sections $A_1$ and $A_2$, they cancel each other. Consequently, equation (4) can be modified into the following form:

$$i_x \cdot \int_v \text{rot} H_o dv = 0$$

Substitution of equations (1) and (3) into the left side of the above equation results in the following:

$$i_x \cdot \int_v \sigma(E + \mu v \times H_o) dv = 0 \qquad (5)$$

From the conditions in equation (2), we now introduce a potential $\Phi$ having a relation $E = -\text{grad } \Phi$.

The equation $i_x \cdot \text{grad } \Phi = div(i_x \Phi)$ for vector calculations is used. First, by dividing the first term of equation (5) by $\sigma$, we obtain $$i_x \cdot \int_v E \, dv = -\int_v div(i_x \Phi) dv$$

Using the Gaussian dispersion theorem again, we have $$i_x \cdot \int_v E dv = -\int_s \Phi(s) i_x \cdot i_n ds - \int_A \{\Phi(z=0) - \Phi(z=1)\} i_x \cdot i_n da \qquad (6)$$

The second term of the right side is zero because of the orthogonality between $i_x$ and $i_n$.

Then, the second term of equation (5) can be changed into the form:

$$i_x \cdot \int_v \mu v \times H_o dv = i_x \cdot o \int^L \{\int_A \mu v \times H_o da\} dz \qquad (7)$$

Since $H_o$ has only a y-component, the vector $\mu v \times H_o$ can be divided into its x- and y-components as follows:

$$\mu v \times H_o = -i_x \mu v \, H_o v_z + i_z \mu v \, H_o v_x$$

By making use of the nature of the fundamental vectors of a coordinate system, the right side of equation (7) can be changed into the form:

$$i_x \cdot \int_v \mu v \times H_o dv = -\mu H_o \cdot o \int^L \{\int_A v_z da\} dz$$

Since $\int_A v_z da = Q$ is constant in the Z-axis direction irrespective of the flow velocity distribution, we have the following:

$$i_x \cdot \int_v \mu v \times H_o \, dv = -\mu H_o \, Q \, L \qquad (8)$$

By substituting equations (6) and (7) into equation (5), we have the following:

$$-\mu H_o \, Q \, L = -\int_s \Phi(s) i_x \cdot i_n \, ds \qquad (9)$$

Equation (9) is a fundamental equation for a three dimensional model of an electromagnetic flowmeter.

In the analysis thus far made, the length L is decreased. It is assumed that the flow velocity distribution does not vary to this degree. By eliminating L from equation (9), the following fundamental equation for a two-dimensional model is derived:

$$-\mu H_o \, Q = -\int_c \Phi(s) i_x \cdot i_n \, dc \qquad (10)$$

The integration is performed over the entire periphery of the cross section.

Where the flow tube assumes a circular cross section, $i_x \cdot i_n = \cos \Phi$. Thus, equation (10) takes the form:

$$Q = -(r/B_o) \int_c \Phi(s) \cos \theta \, d\theta \qquad (11)$$

where r is the diameter of the cross section of the flow tube and $B_o$ is $\mu H_o$.

The description thus far made assumes that the inside of the flow tube is filled with fluid flowing therethrough. The theory can also be applied to cases wherein the inside is not completely filled with liquid and there exists a free liquid surface, and also to cases wherein the flow tube is formed by an open conduit, by considering the process of derivation of the fundamental equation. In these cases, if the flowmeter is so designed that the magnetic field is perpendicular to the free liquid surface, it is not necessary to measure the potential at this portion.

The analysis thus far made assumes that the magnetic field is entirely uniform in the Y-axis direction. We will now discuss cases in which the magnetic field has an X-axis component and is not uniform.

It is first assumed that the magnetic field strength $H_o$ has an X-axis component and can be given by the following:

$$H_o = i_x H_x + i_y H_y$$

where $H_x$ and $H_y$ are functions of location.

In this case, equations (4), (5) and (6) do not depend on the magnetic field. The vector $(\mu v \times H_o)$ included in the right side of equation (7) is give by the following:

$$\mu v \times H_o = -i_x \mu H_y v_z + i_y \mu H_x v_z + i_z \mu (H_y v_x - H_x v_y)$$

Thus, the terms containin $H_x$ appear.

By taking an inner product with $i_x$ and integrating the product, only the first term of the right side remains. The right side of equation (7) is the given by the following:

$$i_x \cdot \int_v \mu v \times H_o v = \mu_o \int^L \{\int_z H_y v_z \, da\} dz \quad (7A)$$

By substituting equations (6) and (7A) into equation (5) we have the following:

$$\mu_o \int^L \{\int_A H_y v_z da\} dz = -\int_s \Phi(s) i_x \cdot i_n ds$$

By making L short, the following equation is dervied as one representing a two dimensional model:

$$\mu \int_A H_y v_z da = -\int_s \Phi(s) i_x \cdot i_n dc$$

Eventually, $H_x$ disappears from the equation. The Y-axis component $\mu H_y (=B_y)$ of the magnetic field at each point is a load tot he flow velocity at this point. That is, the effect of the flow velocity distribution can be reduced by making uniform the Y-axis component of the magnetic field. The effect is independent of the non-uniformity of the X-axis component of the magnetic field.

Figure 4:
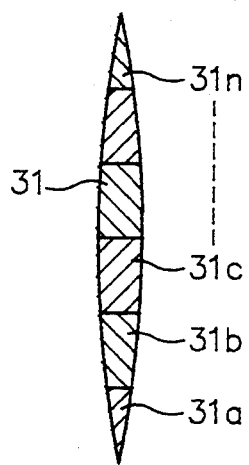
FIGS. 4(a) and 4(b) are diagrams depicting the operation of the embodiment of FIG. 2.
Figure 4:
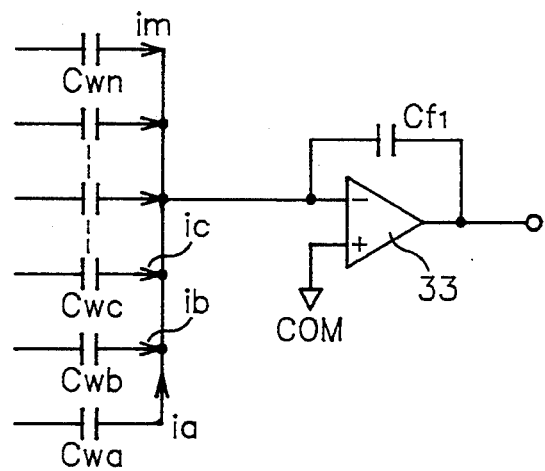

For simplicity, the operation of the flowmeter shown in FIG. 2 is described with reference to FIGS. 4(a) and 4(b), and based on equation (11) for an electromagnetic flowmeter having a circular cross section. FIG. 4(a) shows a detecting electrode 31 divided into n portions for ease of illustration, and FIG. 4(b) shows the operational amplifier 33 connected to electrode 31.

In practice, electrode 31 is constructed to be entirely of one conductor substance. In this example, the n portions $31a, 31b, 31c \ldots, 31n$ of electrode 31 are electrically insulated from each other and mounted on the surface of insulated flow tube 30, or on the inner wall of the flow tub, so as to come into close contact with the surface or wall. Electrostatic capacitances $C_{wa}, C_{wb}, C_{wc}, \ldots, C_{wn}$ are formed respectively between detecting electrode portions $31a$–$31n$ and fluid Q via insulated flow tube 30.

Voltages $v_a, v_b, v_c, \ldots, v_n$ are induced in electrodes parts $31a$–$31n$, respectively, by fluid Q. The induced voltages $v_a$–$v_n$ are converted into current signals $i_a, i_b, i_c, \ldots, i_n$, respectively, by respective small capacitances $C_{wa}, C_{wb}, C_{wc}, \ldots, C_{wn}$, and supplied to the inverting input terminal (−) of amplifier 33. The resulting current is converted back to a voltage by the feedback capacitor $C_{fl}$ and appears at the output terminal.

Accordingly, the voltage $v_o$ appearing at the output terminal of amplifier 33 is given by the following:

$$V_o = (C_{wa}v_a + C_{wb}v_b + C_{wc}v_c + \ldots + C_{wn}v_n)/C_{fl} \quad (12)$$

$$= \sum_{i=a}^{i=n} C_{wi}v_i/C_{fl}$$

The electrostatic capacitance $C_{wi}$ is so selected that the length of the detecting electrode 31 taken in the Z-axis direction of the flow tube 30 is proportional to $\cos \theta_i$. The circumferential length is $\Delta \theta_i$. Therefore, assuming that $K_o$ is a reference capacitance and constant, the electrostatic capacitance $C_{wi}$ is given by the following:

$$C_{wi} = K_o \cos \theta_i \cdot r \cdot \Delta \theta_i \quad (13)$$

By substituting equation (13) into equation (12), we obtain the following:

$$V_o = \sum_{i=a}^{i=n} K_o \cos \theta_i \cdot r \cdot \Delta \theta_i \, v_i/C_{fl}$$

$$= (K_o r/C_{fl}) \sum_{i=a}^{i=n} v_i \cos \theta_i \cdot \Delta \theta_i$$

By increasing the number of portions n, we obtain the following:

$$V_o = (K_o r/C_{fl}) \int_c \Phi(s) \cos \theta \, d\theta \quad (14)$$

By substituting equation (11) into equation (14) we obtain the following:

$$V_o = -K_o B_o Q/C_{fl} \quad (15)$$

Equation (15) was obtained without accounting for the flowvelocity distribution. In this manner, an electromagnetic flowmeter is obtained having an output which is proportional to the flow rate Q and not affected by the flow velocity distribution. In the embodiment, the electromotive force produced on the inner surface of the flow tube 30 is weighted with $\cos \theta$, the current signals derived from the entire detecting electrode 31 is summed, and then the sum current supplied.

Figure 5:
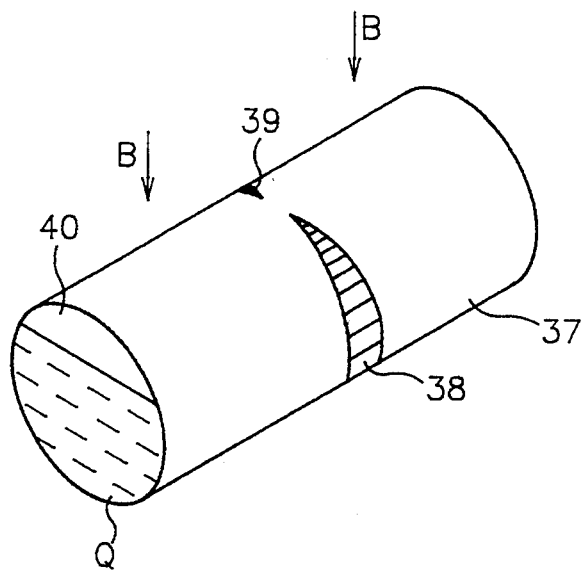
FIG. 5 is a perspective view depicting the embodiment of FIG. 2, wherein the flow rate has been changed.

The description hereinabove set forth is based on a flow tube filled with water. The invention can be similarly applied to a flow tube comprising a circular flow tube having a space therein, ie the flow tube isnot completely filled with liquid. FIG. 5 is a perspective view depicting such a flowmeter.

In FIG. 5, electrodes 38 and 39 are formed on the outer surface of an insulated circular flow tube 37 such that the the length thereof taken along the axis of the flow tube 37 is proportional to $\cos \theta$. Fluid Q, being measured, fills only a part of the inside of flow tube 37. A space 40 remains in the upper portion of flow tube 37. Even with this structure, a current signal representing a flow rate is obtained, as shown in FIGS. 4(a) and 4(b), by detecting the sum of current signals as a signal indicating the flow rate, in the same way as in FIG. 2.

For example, if the electrode $31n$ (see FIG. 4(a)) is not in contact with the fluid Q, the voltage $v_n$ is zero. Also, the electrostatic capacitance $C_{wn}$ is zero. Thus, the impedance at this part is infinitely large. Accordingly, this is not added to the other currents. That is, only currents converted from the electromotive forces produced at the portions where fluid Q exists are added together. Consequently, the flow rate is measured correctly, whether or not flow tube 37 is filled with liquid.

Figure 6:
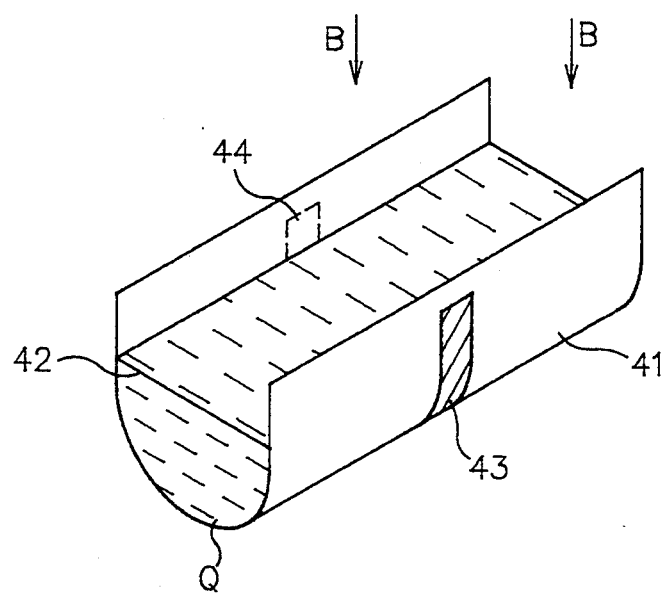
FIG. 6 is a perspective view of the embodiment FIG. 2, wherein the state of flow is formed by an open conduit.

FIG. 6 shows a flow tube having an open conduit 41, which is insulated and has a U-shaped form. The inside of conduit 41 is filled with fluid Q being measured. A magnetic field B is applied perpendicularly to a free liquid surface 42. Detecting electrodes 43, and 44 have a given length along the axis of conduit 41, and are mounted on the curved surface of conduit 41.

The length of electrodes 43 and 44, taken longitudinally of conduit 41, is selected so as to be proportional to the cosine of an angle $\theta$ made between a normal to the wall of conduit 41 and an axis vertical to both the longitudinal direction of conduit 41 and magnetic field B, with reference to equation (10).

Figure 7:
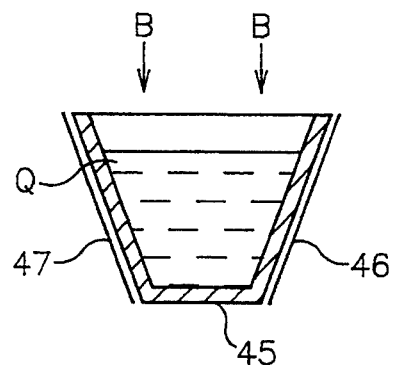
FIGS. 7(a) and 7(b) are perspective view depicting other embodiments similar to the embodiment of FIG. 2, wherein the flow tubes have open conduits of different shapes.
Figure 7:
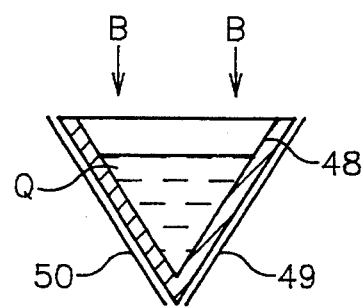

FIGS. 7(a) and 7(b) are cross sectional views of open conduits having trapezoidal and triangular shapes, respectively. In FIG. 7(a), an insulated conduit 45 has mounted on the side wall thereof detecting electrodes 46 and 47. The length of electrodes 46 and 47, taken along the longitudinal dimension of conduit 45, is selected so as to be proportional to cos $\theta$, in the same manner as FIG. 6. In FIG. 7(b) an insulated conduit 48 has mounted on the side wall thereof detecting electrodes 49 and 50. The length of electrodes 49 and 50, taken along the longitudinal dimension of conduit 48 is selected so as to be proportional to cos $\theta$, in the same manner as FIG. 6.

Figure 8:
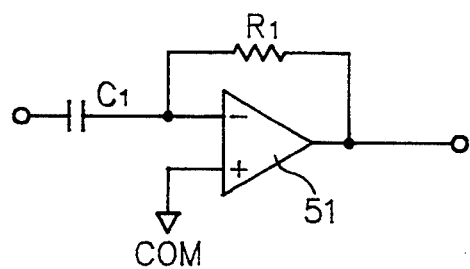
FIG. 8 is a circuit diagram depicting a first modification of an amplifier of FIG. 2.

FIG. 8 shows an operational amplifier 51, which is similar to the amplifier 33 of FIG. 2, except that capacitor $C_{f1}$ is replaced by resistor $R_1$. An electrostatic capacitance $C_1$ is provided between the inverting input terminal (−) and fluid Q being measured. A A signal voltage produced by fluid Q is converted into an electrical current signal by electrostatic capacitance $C_1$, then converted into a voltage signal by resistor $R_1$, and appears at the output terminal of amplifier 51 as a voltage signal.

Figure 9:
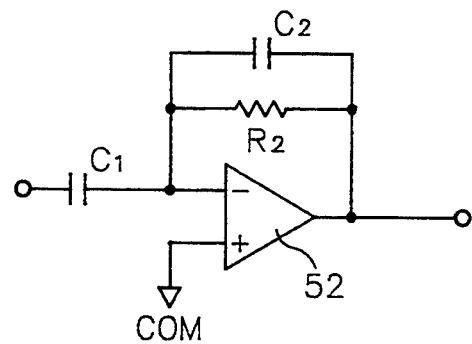
FIG. 9 is a circuit diagram depicting a second modification of an amplifier shown in FIG. 2.

FIG. 9 shows an operational amplifier provided with a parallel combination of resistor $R_2$ and capacitor $C_2$ (replacing the capacitor $C_{f1}$ of FIG. 2) which forms a feedback circuit for amplifier 52. Also, a capacitor $C_1$ is added, similar to FIG. 8. In this embodiment, phase varies between the input and the output. Thus, it is necessary to take into account the phase when signals are treated in succeeding stages.

Figure 10:
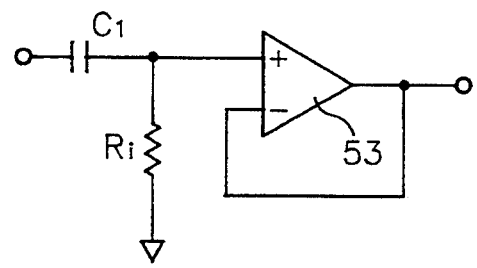
FIG. 10 is a circuit diagram depicting a third modification of an amplifier shown in FIG. 2.

FIG. 10 shows an operational amplifier to which a voltage is applied. A signal voltage is developed in fluid Q being measured. This signal voltage is converted into a current signal by an electrostatic capacitance $C_1$ at the input side of amplifier 53, because $$\left|\frac{1}{WC}\right| >> R_i.$$

The converted current signal is converted into a voltage signal by a resistor $R_i$. The voltage signal is amplified by amplifier 53. Also, the inverting input terminal (−) is connected to the output terminal, as depicted.

The voltage input-type operational amplifier of FIG. 10 can be used in an electromagnetic flowmeter comprising an open conduit which is not completely filled with liquid. However, where the FIG. 10 amplifier is used in a flowmeter having a flow tube consisting of an open conduit, i.e. the inside of the flow tube is not completely filled with liquid, the measurement of flow rate may be not entirely optimal. This can be improved by using the arrangement shown in FIG. 11.

Figure 11:
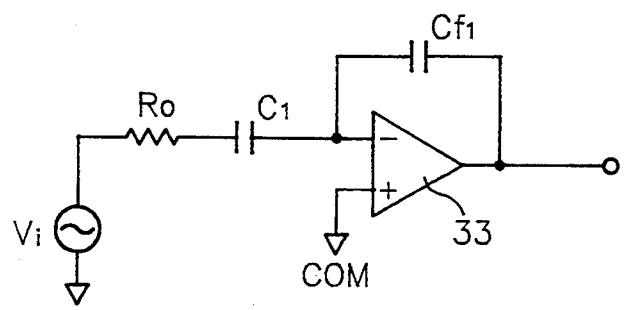
FIG. 11 is a circuit diagram depicting the effect produced by the embodiment of FIG. 2.

In the described embodiment, a resistor $R_o$ is provided in contact with the liquid and connected in series with electrostatic capacitor $C_1$, as shown in FIG. 11. The impedance of capacitor $C_1$ is much larger than the resistance of resistor $R_o$ in contact with the liquid. Consequently, the measured flow rate is not readily affected by variations in the resistor $R_o$, e.g., the electrical conductivity.

If a detecting electrode touches the fluid being measured, a DC potential is produced by an electrochemical action. Since this DC potential varies, the indicated flow rate also varies. In the flowmeter described thus far, no detecting electrode touches the fluid and hence this undesired phenomenon does not occur.

Since a signal is detected via the electrostatic capacitance, if the magnetic field is other than a DC magnetic field, then an exciting means having various waveforms, such as rectangular and sinusoidal, can be used.

In the embodiment, the length of detecting electrodes taken axially of the flow tube, is varied while maintaining a certain relation give by the function cos $\theta$. Theoretically, the effect of the flow velocity distribution can be eliminated by changing the distance between each detecting electrode and the fluid being measured, while maintaining the same relation give by the function. In practice, however, it is difficult to fabricate a flow tube having a thickness that satisfies the relationship given by cos $\theta$. Furthermore, as discussed, each detecting electrode is provided in the outer surface of the flow tube. However, each detecting electrode can be built in the flow tube.

As discussed, in the flow meter disclosed herein, capacitance detection type detecting electrodes are so shaped that errors caused by flow velocity distribution are reduced. Potentials on the inner wall of the flow tube are detected by the detecting electrodes. The weighted mean value of the potentials is extracted. Hence, an electromagnetic flowmeter which is less affected by the flow velocity distribution is realized. The flat shape of the electrodes provides a means for producing the weighted mean value. Consequently, the flow meter can be fabricated at low cost.

Also, in the flowmeter of the invention, signal potentials developed on the inner wall of an open conduit are converted into current signals via electrostatic capacitances. Hence, current signals reflecting variations in the liquid level can be combined. The flow rate in the open conduit can be measured without being affected by variations in the liquid level.

Furthermore, in the invention, a receiver circuit is built so as to detect electrical currents. Thus, flow rates can be measured correctly and accurately, irrespective of whether or not the inside of the flow tube in completely filled with liquid, and irrespective of the distribution of flow velocities.

Moreover, in the invention flowmeter, the length of each detecting electrode taken axially of the flow tube is proportional to the cosine of the angle made between a normal to the wall of the conduit and an axis vertical to both the axis of the flow tube and the magnetic field. Thus, flow rates in the open conduit can be made independent of variations in the level of the liquid and are not affected by flow velocity distribution.

Also, in the invention, a receiver circuit is built so as to detect voltage signals. Hence, if the flow tube is filled with fluid, flow rates can be measured correctly and accurately.

Moreover, in the invention, the flow tube and conduit can be of various shapes and forms, although the same measuring principles are utilized. Thus, the shape can be adjusted according to the particular subject matter being measured. This extends the range of applications and increases the utility of the invention.

The foregoing description is illustrative of the principles of the invention. Numerous extensions and modifications thereof would be apparent to the worker skilled in the art. All such extensions and modifications are to be construed to be within the spirit and scope of the invention.

What is claimed is:

1. A capacitance type electromagnetic flowmeter comprising
    a flow tube electrically insulated at least on an inner surface thereof and through which fluid to be measured flows;
    an exciting means for applying a magnetic field to said fluid in said flow tube in an orthogonal relation to an axis of said flow tube;
    a pair of detecting electrodes disposed in said flow tube and electrically insulated from said fluid, said pair of electrodes extending perpendicular to both said axis of said flow tube and said magnetic field and having a variable dimension as measured along the axis of the flow tube, said dimension of each of said pair of electrodes being proportional to a cosine of an angle between a line normal to a wall of said flow tube and an axis which is perpendicular to both said axis of said flow tube and said magnetic field; and
    means for summing up signals taken along the variable dimension of said electrodes to produce a signal indicative of the fluid flow rate.

2. The flowmeter of claim 1, wherein current signals produced at said pair of detecting electrodes are converted into voltage signals by a current-to-voltage converter means.

3. The flowmeter of claim 1 or 2, wherein said flow tube is a closed tube and is completely filled with fluid.

4. The flowmeter of claim 1 or 2, wherein said flow tube is closed and circular, and is partially filled with said fluid.

5. A capacitance type electromagnetic flowmeter comprising
    a flow tube electrically insulated at least on an inner surface thereof and through which fluid to be measured flows;
    an exciting means for applying a magnetic field to said fluid in said flow tube in an orthogonal relation to an axis of said flow tube; and
    a pair of detecting electrodes disposed in said flow tube and electrically insulated from said fluid, said pair of electrodes extending perpendicular to both said axis of said flow tube and said magnetic field, a length of each of said pair of electrodes taken axially of said flow tube being proportional to a cosine of an angle between a line normal to a wall of said flow tube and an axis which is perpendicular to both said axis of said flow tube and said magnetic field; and further comprising
    input resistors for converting current signals fed to said pair of detecting electrodes into voltage signals; and
    amplifier means for amplifying said voltage signals.

6. The flowmeter of claim 5, wherein said flow tube is a closed tube and is completely filled with fluid.

7. The flowmeter of claim 5, wherein said flow tube is closed and circular, and is partially filled with said fluid.

8. A capacitance type electromagnetic flowmeter comprising
    a conduit which is electrically insulated at least on an inner surface thereof and through which a fluid to be measured flows, said conduit being partially filled with said fluid so that a liquid surface is formed;
    and exciting means for applying a magnetic field perpendicular to said liquid surface;
    a pair of detecting electrodes disposed in said conduit and electrically insulated from said fluid; and
    a current-to-voltage converter means for converting electrical current signals, produced at said pair of detecting electrodes according to a flow rate of said fluid, into voltage signals;
    wherein a length of each of said pair of detecting electrodes taken along an axis of said conduit is proportional to a cosine of an angle between a line normal to a wall of said conduit and an axis which is perpendicular to both said axis of said conduit and to said magnetic field; and further comprising
    input resistors for converting current signals fed to said pair of detecting electrodes into voltage signals; and
    amplifier means for amplifying said voltage signals.

9. The flowmeter of claim 8, wherein said conduit is a partially open conduit.

10. The flowmeter of claim 8, wherein said conduit has a closed periphery.

* * * * *